(12) United States Patent
Kwasniewski et al.

(10) Patent No.: US 8,974,342 B2
(45) Date of Patent: Mar. 10, 2015

(54) AXLE ASSEMBLY HAVING A LUBRICANT RESERVOIR MODULE

(75) Inventors: Dale Kwasniewski, Galesburg, MI (US); Harry Trost, Royal Oak, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 120 days.

(21) Appl. No.: 13/463,917

(22) Filed: May 4, 2012

(65) Prior Publication Data

US 2013/0296095 A1    Nov. 7, 2013

(51) Int. Cl.
*F16H 57/04* (2010.01)

(52) U.S. Cl.
USPC ............................................ 475/160; 74/607

(58) Field of Classification Search
None
See application file for complete search history.

(56) References Cited

U.S. PATENT DOCUMENTS

| | | | |
|---|---|---|---|
| 1,966,434 A * | 7/1934 | Barker | 184/11.1 |
| 2,242,195 A | 5/1941 | Teker et al. | |
| 5,540,300 A | 7/1996 | Downs et al. | |
| 6,132,329 A | 10/2000 | Tison | |

FOREIGN PATENT DOCUMENTS

| | | |
|---|---|---|
| DE | 710894 C | 9/1941 |
| EP | 1375970 A2 | 1/2004 |
| EP | 2660493 A1 | 11/2013 |
| JP | 59-37462 U | 3/1984 |
| JP | 2012210839 A * | 11/2012 |

OTHER PUBLICATIONS

European Patent Office, Extended European Search Report for European Patent Application No. EP 13154709.3 mailed Apr. 11, 2013.

* cited by examiner

*Primary Examiner* — Robert A Siconolfi
*Assistant Examiner* — Huan Le
(74) *Attorney, Agent, or Firm* — Brooks Kushman P.C.

(57) ABSTRACT

An axle assembly having a housing, a reservoir module, and an axle. The reservoir module may be configured to receive a lubricant and may be disposed in an arm portion of the housing. The axle may be disposed in the arm portion such that the axle extends through and is spaced apart from a tube portion of the reservoir module.

20 Claims, 3 Drawing Sheets

US 8,974,342 B2

AXLE ASSEMBLY HAVING A LUBRICANT RESERVOIR MODULE

TECHNICAL FIELD

The present application relates to an axle assembly having a reservoir module for receiving and storing lubricant.

BACKGROUND

An axle assembly lubrication apparatus is disclosed in U.S. Pat. No. 6,132,329.

SUMMARY

In at least one embodiment an axle assembly is provided. The axle assembly may include a housing, a reservoir module, and an axle. The housing may have an arm portion. The reservoir module may be disposed in the arm portion and may be configured to hold a volume of a lubricant. The reservoir module may have a tube portion. The axle may be disposed in the arm portion such that the axle extends through and is spaced apart from the tube portion.

In at least one embodiment an axle assembly is provided. The axle assembly may include a housing, a reservoir module, and an axle. The housing may have an arm portion. The reservoir module may be disposed in the arm portion and may have a first end plate, a second end plate, and a tube portion that extends from the first end plate to the second end plate. The axle may be disposed in the arm portion such that the axle extends through and is spaced apart from the tube portion.

In at least one embodiment an axle assembly is provided. The axle assembly may include a housing, a differential, an axle, and a reservoir module. The housing may have an arm portion. The differential may be disposed in the housing and may be spaced apart from the arm portion. The axle may be disposed in the arm portion and may be configured to be rotated by the differential. The reservoir module may be disposed in the arm portion and may at least partially define a reservoir cavity that is configured to receive a lubricant. The reservoir module may have a first end plate, a second end plate, a tube portion, and a valve. The first end plate may have an outlet. The second end plate may be spaced apart from the first end plate. The tube portion may extend from the first end plate to the second end plate. The valve may control the flow of lubricant through the outlet. The axle may extend through the tube portion and may be spaced apart from the reservoir module.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
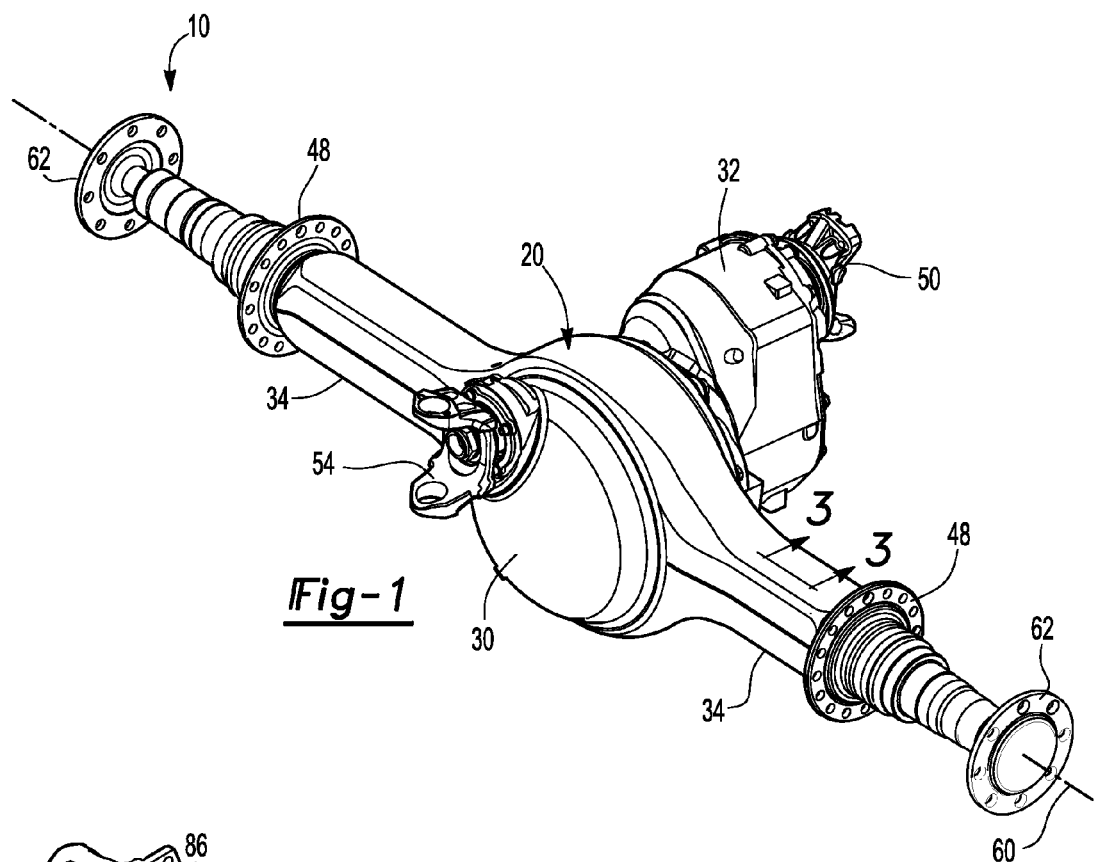
FIG. 1 is a perspective view of an exemplary axle assembly.
Figure 2:
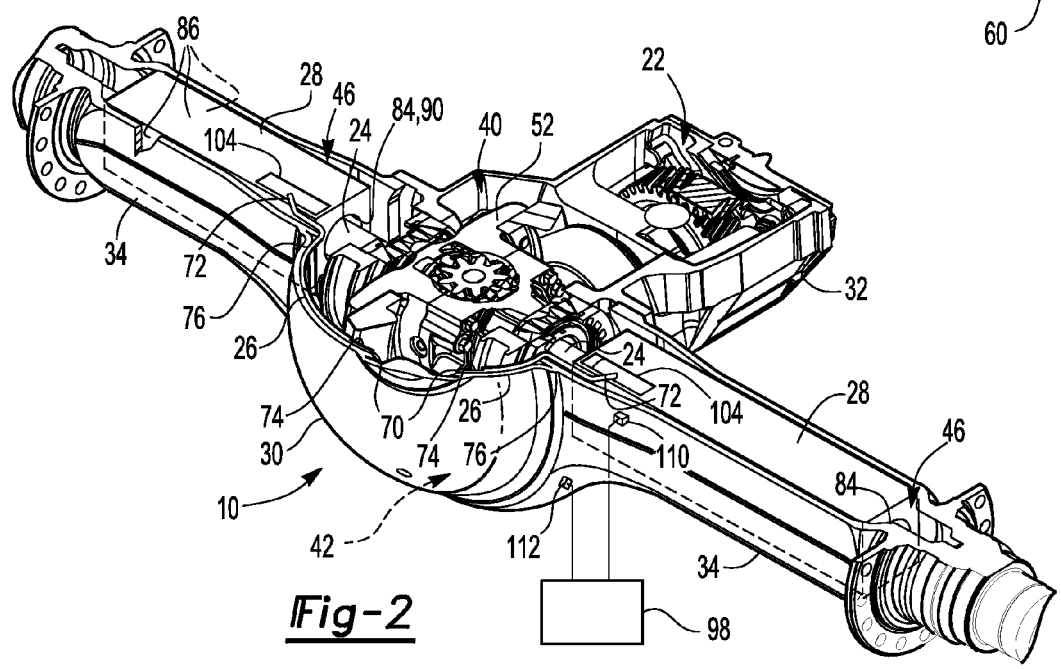
FIG. 2 is a fragmentary perspective view of a portion of the axle assembly.
Figure 3:
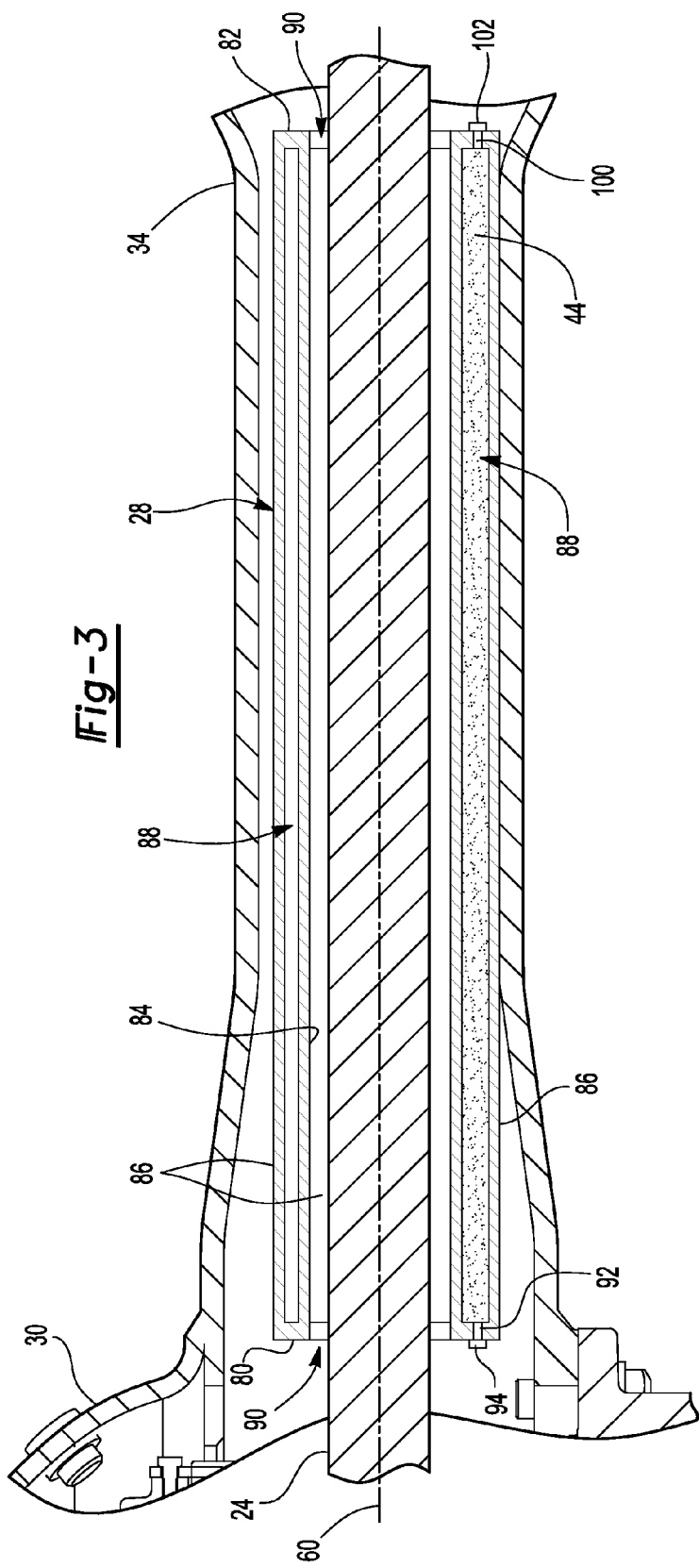
FIG. 3 is a section view of a portion of the axle assembly along section line 3-3 showing an embodiment of reservoir module.

Referring to FIGS. 1-3, an exemplary axle assembly 10 is shown. The axle assembly 10 may be provided with a motor vehicle like a truck, bus, farm equipment, military transport or weaponry vehicle, or cargo loading equipment for land, air, or marine vessels.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 shown in FIG. 1 may be part of a tandem axle configuration or multi-axle configuration that includes a plurality of axle assemblies that may be connected in series.

In at least one embodiment, the axle assembly 10 may include a housing 20, a differential 22, at least one axle 24, at least one lubricant conduit 26, and at least one reservoir module 28.

The housing 20 may receive various components of the axle assembly 10. In addition, the housing 20 may facilitate mounting of the axle assembly 10 to the vehicle. The housing 20 may include multiple components that may be assembled together in any suitable manner, such as by welding and/or with one or more fasteners. In at least one embodiment, the housing 20 may include a center portion 30, a differential carrier portion, 32, and at least one arm portion 34.

The center portion 30 may be disposed proximate the center of the housing 20. The center portion 30 may define a cavity 40 that may receive at least a portion of the differential 22. The region of the cavity 40 located below the differential 22 may at least partially define a sump portion 42 that may contain a lubricant 44. The lubricant 44 may flow down the sides of the center portion 30 and gather in the sump portion 42. The lubricant 44, which may be oil, may lubricate components of the axle assembly 10, such as the differential 22.

The differential carrier portion 32 may be disposed proximate the center portion 30. The differential carrier portion 32 may support components of the differential 22 and may also define a cavity that receives at least a portion of the differential 22. In at least one embodiment, the differential carrier portion 32 may be coupled to the center portion 30 in any suitable manner, such as with one or more fasteners like a bolt.

One or more arm portions 34 may extend from the center portion 30. In the embodiment shown in FIG. 1, two arm portions 34 are provided that extend in opposite directions from the center portion 30 and the differential 22. An arm portion 34 or a portion thereof may be integrally formed with the center portion 30 in one or more embodiments. Each arm portion 34 may define an arm cavity 46 that may receive an axle 24 and a reservoir module 28 as will be discussed in more detail below. The arm portion 34 and arm cavity 46 may be disposed above the sump portion 42 in one or more embodiments. As such, lubricant 44 that is released from a reservoir module 28 may flow down into the sump portion 42. Each arm portion 34 may also have an end flange 48 that is disposed proximate an end of the arm portion 34.

The differential 22 may be disposed in the housing 20. The differential 22 may be configured to transmit torque to the vehicle traction wheel assemblies and permit the traction wheel assemblies to rotate at different velocities. An input yoke 50, a ring gear 52, and an optional output yoke 54 are highlighted in FIGS. 1 and 2 to facilitate an abbreviated discussion of the operation of the differential 22.

The input yoke 50 may facilitate coupling of the axle assembly 10 to a torque source. For example, the input yoke 50 may be coupled to a drive shaft that may be coupled to an output of a vehicle transmission. Alternatively, the input yoke 50 may be coupled to a connection shaft or prop shaft that may be coupled to an output yoke 54 of another axle assembly 10. The input yoke 50 may be disposed on an input shaft that may be rotatably supported by one or more bearings that may be disposed in the differential carrier portion 32 of the housing 20. Torque that is provided to the input yoke and input shaft may be transmitted to the ring gear 52 via various intermediate gears and to the output yoke 54, if provided. Torque may be transmitted from the ring gear 52 to each axle 24 and from each axle 24 to at least one corresponding traction wheel assembly.

The ring gear 52 may rotate about an axis and may splash lubricant 44 that accumulates in the sump portion 42 as it rotates. As will be discussed in more detail below, such lubricant 44 may be captured and stored in a reservoir module 28 to reduce the volume of lubricant 44 in the sump portion 42 under various conditions. Reducing the volume of lubricant 44 in the sump portion 42 may reduce frictional drag that may be exerted upon the ring gear 52 by the lubricant 44 and may improve vehicle fuel economy.

One or more axles 24 may transmit torque from the differential 22 to a traction wheel assembly. In FIGS. 1 and 2, two axles 24 are provided such that each axle 24 extends through a different arm cavity 46. The axles 24 may extend along and may be rotated about an axis 60 by the differential 22. Each axle 24 may have a first end and a second end. The first end may be coupled to the differential 22. The second end may be disposed opposite the first end and may be located outside of the housing 20. An axle flange 62 may be disposed at the second end and may facilitate mounting of a wheel hub and traction wheel assembly. An axle bearing may be provided between the first and second ends of the axle 24 to rotatably support the axle 24. The axle bearing may be located between the reservoir module 28 and the axle flange 62 in one or more embodiments.

At least one lubricant conduit 26 may be provided to route lubricant 44 to a reservoir module 28. A lubricant conduit 26 may be configured to receive or capture lubricant 44 that is splashed or sprayed inside the housing 20 by the differential 22. In at least one embodiment, the lubricant conduit 26 or a portion thereof may be configured as a groove or open channel that may receive lubricant 44 that is sprayed or splashed by the ring gear 52 or that drips down an interior surface of the center portion 30. Such a groove or channel may face upward or generally away from the sump portion 42 or may include an opening through which lubricant 44 may be received. The lubricant conduit 26 also be configured to direct lubricant to the differential 22, but may be spaced apart from the ring gear 52 so as to not interfere with rotation of the ring gear 52 or strip lubricant 44 from the ring gear surfaces.

The lubricant conduit 26 may extend along an interior surface of the center portion 30 and the arm portion 34 of the housing 20 in one or more embodiments. For example, the lubricant conduit 26 may be integrally formed with the housing 20. Alternatively, the lubricant conduit 26 may be provided as a separate component that may be coupled to the housing 20 in any suitable manner, such as by welding or with a fastener. In addition, a lubricant conduit 26 or a portion thereof may slope downwardly from the center portion 30 of the housing 20 toward a reservoir module 28 to facilitate the flow of lubricant 44 to a reservoir module 28.

A lubricant conduit 26 may route lubricant 44 to one or more reservoir modules 28. For instance, a single lubricant conduit 26 may be provided that has opposing ends that terminate at different reservoir modules 28. Alternatively, a lubricant conduit 26 may provide lubricant 44 to a single reservoir module 28 as depicted in the embodiment shown in FIG. 2. More specifically, two lubricant conduits 26 are shown in FIG. 2 that provide lubricant 44 to different reservoir modules 28. In such an embodiment, the lubricant conduit 26 may include a first end 70 and a second end 72.

The first end 70 may be disposed in the cavity 40 of the center portion 30 to help capture lubricant 44 as previously described. At least a portion of the lubricant conduit 26 in the center portion 30 or near the first end 70 may include an upward facing opening 74. In FIG. 2, the opening 74 extends from the first end 70 toward the second end 72. Such an opening 74 may be provided by removing an upper section of a pipe or tube in one or more embodiments or by integrally forming a groove or channel with the housing 20 as previously discussed. Alternatively, the first end 70 or another portion of the lubricant conduit 26 may be fluidly connected to a pump or receive lubricant 44 that is supplied by a pump. As such, a pump may be used to pump lubricant 44 out of the sump portion 42 and into the reservoir module 28 via one or more lubricant conduits 26.

The second end 72 may be disposed opposite the first end 70. The second end 72 may be located in the arm portion 34 of the housing 20 and may terminate at or near an inlet of the reservoir module 28. A region near the second end 72 may be enclosed or may include an enclosed portion 76 to help retain lubricant 44 within the lubricant conduit 26 as it is routed to the reservoir module 28. For instance, the enclosed portion 76 of the lubricant conduit 26 may define a through hole through which lubricant 44 may flow. In at least one embodiment, the enclosed portion 76 may begin in the center portion 30 and may end at the reservoir module 28. Alternatively, the enclosed portion 76 may be omitted in one or more embodiments.

At least one reservoir module 28 may be provided to receive lubricant 44 and/or store a volume of lubricant 44 that might otherwise accumulate in the sump portion 42. A reservoir module 28 may be disposed in at least one arm portion 34 of the housing 20.

Referring to FIGS. 2 and 3, a first embodiment of a reservoir module 28 is shown. In this embodiment, the reservoir module 28 may include a first end plate 80, a second end plate 82, a tube portion 84, and a set of side plates 86 that may cooperate to at least partially define a reservoir cavity 88 that is configured to store a volume of lubricant 44. In FIG. 3, the reservoir cavity 88 is shown partially filled, but may contain a greater or lesser volume of lubricant 44.

The first end plate 80 may face toward the differential 22 and may engage one or more surfaces of the arm portion 34 to help position the reservoir module 28. The first end plate 80 may include a tube opening 90, a first outlet 92, and optionally a first outlet valve 94.

The first outlet 92 may be configured as a through hole that may extend through the first end plate 80 to the reservoir cavity 88. The first outlet 92 may be disposed generally below the tube opening 90. In at least one embodiment, the first outlet 92 may be sized to control the flow of lubricant 44 out of the reservoir cavity 88. For instance, the first outlet 92 may be sized such that the volume of lubricant 44 that flows out of the reservoir module 28 exceeds the volume of lubricant 44 that flows into the reservoir module 28 at low vehicle speeds (i.e., low differential rotational speeds) but is less than the volume of lubricant 44 that flows out of the reservoir module 28 at high vehicle speeds (i.e., high differential rotational speeds).

The first outlet valve 94, if provided, may control the flow of lubricant 44 out of the reservoir cavity 88 through the first outlet 92. The first outlet valve 94 may have any suitable configuration. For example, the first outlet valve 94 may be a passive valve, such as a bimetallic valve that may include different metals or metal alloys that expand at different rates in response to temperature. As such, a bimetallic valve may be configured to open at higher axle assembly operating temperatures to permit the flow of lubricant 44 from the reservoir module 28 to the sump portion 42 and close a lower temperatures. The first outlet valve 94 may also be an active valve that may have an actuator. For example, an active valve may have a pneumatic, hydraulic, electrical, or electromechanical actuator that may be controlled by a controller 98 as will be discussed in more detail below.

The second end plate 82 may be disposed at an opposite end of the reservoir module 28 from the first end plate 80. Like the first end plate 80, the second end plate 82 may engage one or more surfaces of the arm portion 34 to help position the reservoir module 28. The second end plate 82 may also include a tube opening 90, an optionally a second outlet 100 and second outlet valve 102.

The second outlet 100, if provided, may be configured as a through hole that may extend through the second end plate 82 to the reservoir cavity 88. The second outlet 100 may be disposed generally below the tube opening 90 and may be configured to provide lubricant 44 to an axle bearing. In at least one embodiment, the second outlet 100 may be sized to control the flow of lubricant 44 out of the reservoir cavity 88. The flow of lubricant 44 may be due to the head pressure exerted by the lubricant 44 in the reservoir cavity 88. Alternatively, a second outlet valve 102 may be provided to control the flow of lubricant 44 out of the reservoir cavity 88 through the second outlet 100. The second outlet valve 102 may be a passive or active valve as previously discussed with reference to the first outlet valve 94.

The tube portion 84 may extend from the first end plate 80 to the second end plate 82 and may be spaced apart from the axle 24. In at least one embodiment, the tube portion 84 may generally extend along the axis 60 and may have a generally cylindrical configuration. In at least one embodiment, the tube portion 84 may be configured to flex with respect to the axle 24 to help facilitate installation. For example, the tube portion 84 may be made of a flexible material, such as a polymeric material like a plastic, rubber, or synthetic rubber such as neoprene. In addition, lubricant 44 may also pass through the tube portion 84 to provide lubricant 44 to an axle bearing. For example, lubricant 44 may splash into and flow along the tube portion 84 or may be carried along the axle 24 through the tube portion 84 toward the second end plate 82 and may drip off the axle 24 or reservoir module 28 to lubricate an axle bearing or other components that may be located outwardly from the second end plate 82.

The set of side plates 86 may include one or more members that may at least partially define a side of the reservoir module 28. Each side plate 86 may extend from the first end plate 80 to the second end plate 82. In at least one embodiment, each side plate 86 may be disposed adjacent to and may engage at least one other side plate 86. In the embodiment shown, four side plates 86 are provided that engage at least two other side plates 86 to provide a box-like configuration in which opposing pairs of side plates 86 are disposed substantially parallel to each other. As such, the reservoir cavity 88 may be disposed between the side plates 86 and the tube portion 84, thereby providing an enclosed cavity that allows the reservoir cavity 88 to extend around the axle 24 in a ring-like manner. Such a configuration may facilitate lubricant storage without enlarging the housing 20 or arm portions 34 to increase the volume or available space in the housing 20. In addition, the side plate 86 disposed proximate the bottom of the arm portion 34 may be disposed above the sump portion 42 in one or more embodiments such that lubricant 44 released from the reservoir module 28 flows downward or under the force of gravity into the sump portion 42.

The reservoir module 28 may be fabricated in any suitable manner. For example, the reservoir module 28 may be made of a polymeric material that may be blow molded or with a plurality of metal components that may be welded or otherwise joined together.

The reservoir module 28 may also include an inlet 104 that receives lubricant 44 from the lubricant conduit 26. The lubricant conduit 26 may be disposed near the inlet 104 or extend into the inlet 104 in one or more embodiments. The inlet 104 may be configured as a through hole and may be provided in the first end plate 80 or a side plate 86 in various embodiments. In the embodiment shown in FIG. 2, the inlet 104 is disposed in the side plate 86 that is located at the top of the reservoir module 28 and near the first end plate 80.

Figure 4:
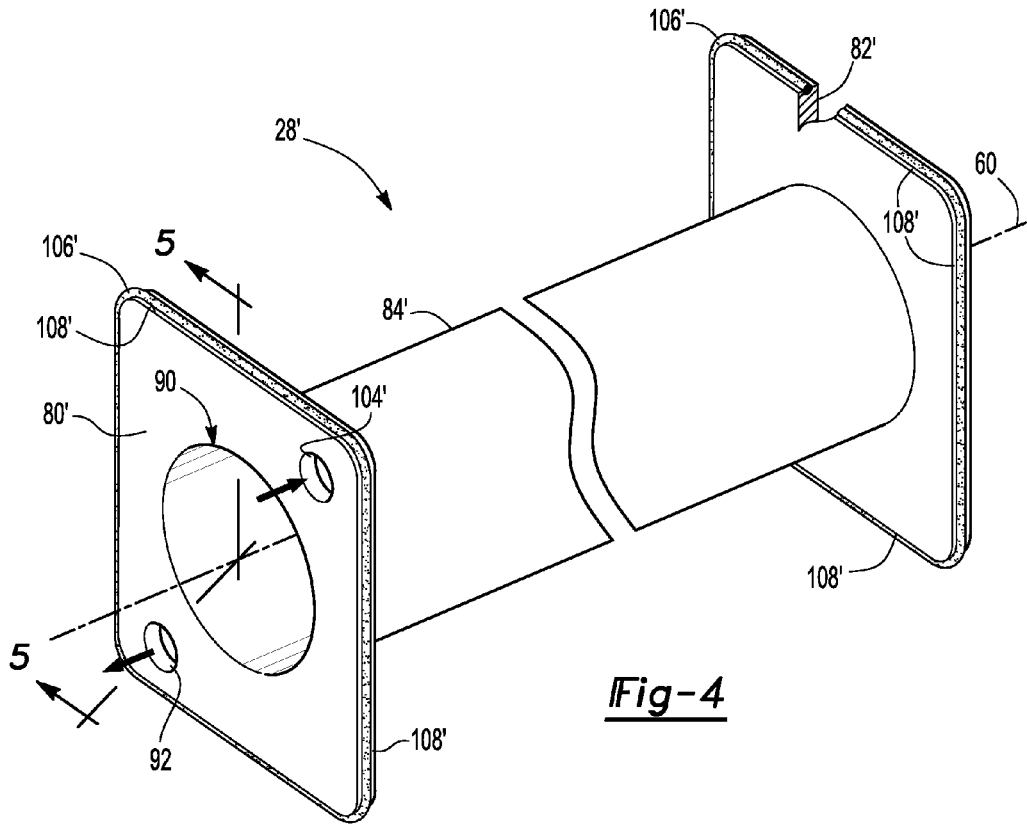
FIG. 4 is a perspective view of another embodiment of a reservoir module.
Figure 5:
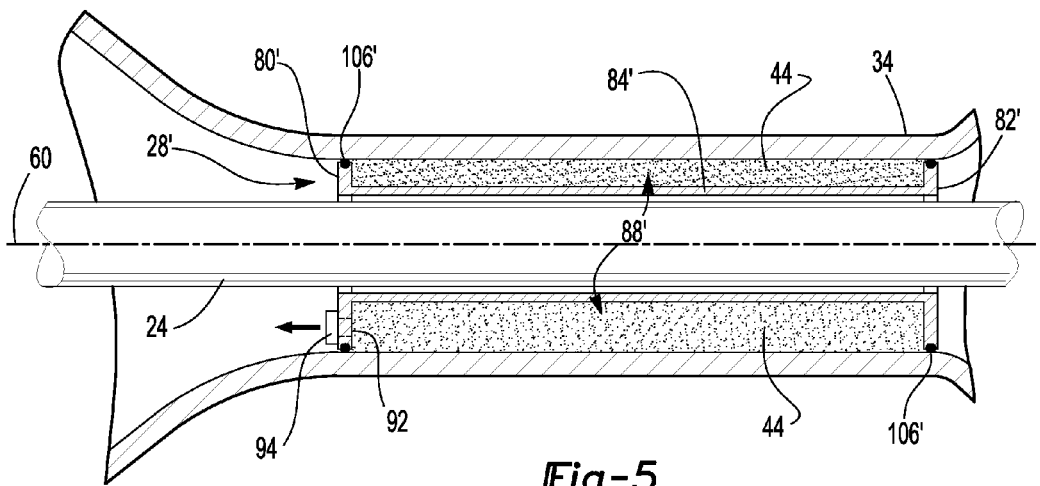
FIG. 5 is a section view of a portion of an axle assembly and the reservoir module shown in FIG. 4.

Referring to FIGS. 4 and 5, another embodiment of a reservoir module 28' is shown. In this embodiment, the side plates 86 are omitted, resulting in a reservoir module 28' that may include a first end plate 80', a second end plate 82', and a tube portion 84' that may cooperate with the arm portion 34 of the housing 20 to at least partially define a reservoir cavity 88' that is configured to store a volume of lubricant 44. As such, the arm portion 34 may at least partially define the reservoir cavity 88'. In such embodiments, heat may be transferred from the lubricant 44 to the arm portion 34 to help reduce the temperature of lubricant 44 in the reservoir cavity 88'.

The first end plate 80' may face toward the differential 22 and may be disposed proximate or may engage one or more surfaces of the arm portion 34 to help position the reservoir module 28'. The first end plate 80' may include a tube opening 90, a first outlet 92, and optionally a first outlet valve 94 like the first end plate 80 of reservoir module 28. In addition, the first end plate 80' may have an inlet 104' and a seal 106'.

The inlet 104' may receive lubricant 44 from the lubricant conduit 26 and may be disposed above the first outlet 92. In at least one embodiment, the inlet 104' may also be disposed above the tube portion 84'. The inlet 104' may be a through hole or may be disposed adjacent to an edge or edge surface to the first end plate 80', such as a top edge surface, in various embodiments.

The seal 106' may be provided to help retain lubricant 44 in the reservoir cavity 88'. The seal 106' may be disposed along the perimeter or along one or more edge surfaces 108' of the first end plate 80'. As such, the seal 106' may be disposed between and may engage the first end plate 80' and the arm portion 34 of the housing 20 to inhibit lubricant 44 in the reservoir cavity 88' from leaking or passing around the first end plate 80'.

The second end plate 82' may be disposed at an opposite end of the reservoir module 28' from the first end plate 80'. Like the first end plate 80', the second end plate 82' may be disposed proximate or may engage one or more surfaces of the arm portion 34 to help position the reservoir module 28'. The second end plate 82' may also include a tube opening 90, and optionally a second outlet 100 and second outlet valve 102 like the second end plate 82 of reservoir module 28. In addition, the second end plate 82' may include a seal 106' similar to that which may be provided with the first end plate 80'.

Referring again to FIG. 2, the controller 98 may be configured actuate the first outlet valve 94 and/or the second outlet valve 102 between an open position and a closed position. In the open position, lubricant 44 may be permitted to flow through a corresponding outlet, such as the first outlet 92 or the second outlet 100. In the closed position, lubricant 44 may be inhibited from flowing through a corresponding outlet, such as the first outlet 92 or the second outlet 100. The controller 98 may also receive data or a signal from one or more sensors, such as a volume sensor 110 and/or a differential temperature sensor 112, which may be used to control actuation of the first and/or second outlet valves 94, 102.

The volume sensor 110 may be disposed in the reservoir module 28, 28' and may be configured to detect or provide a signal indicative of a volume of lubricant 44 in the reservoir cavity 88, 88'. The controller 98 may open the first and/or second outlet valves 94, 102 when the volume of lubricant 44 exceeds a threshold volume value and may close the first and/or second outlet valves 94, 102 when volume of lubricant 44 does not exceed the threshold volume value. The threshold volume value may be established based on vehicle development testing.

The differential temperature sensor 112 may be disposed in the housing 20 and may be configured to detect or provide a signal indicative of a temperature proximate the differential 22. For example, the differential temperature sensor 112 may detect the temperature of lubricant 44 in the sump portion 42. The controller 98 may open the first and/or second outlet valves 94, 102 when the differential temperature exceeds a threshold differential temperature value and may close the first and/or second outlet valves 94, 102 when the differential temperature does not exceed the threshold differential temperature value. The threshold differential temperature value may be established based on vehicle development testing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a differential;
    a housing having a sump portion disposed proximate the differential and an arm portion that includes an end flange;
    a reservoir module that is disposed in the arm portion between the differential and the end flange and configured to hold a volume of a lubricant, the reservoir module having a tube portion that is completely spaced apart from the housing;
    an axle that is disposed in the arm portion such that the axle extends through and is spaced apart from the tube portion; and
    a lubricant conduit that is disposed in the housing, wherein the lubricant conduit receives lubricant that splashes off the differential and provides the lubricant to the reservoir module;
    wherein the lubricant conduit and reservoir module are disposed above the sump portion.

2. The axle assembly of claim 1 wherein the axle and the tube portion are coaxially disposed.

3. The axle assembly of claim 1 wherein the reservoir module has an inlet for providing the lubricant to the reservoir module.

4. The axle assembly of claim 3 wherein the reservoir module has an end plate and the inlet is provided with the end plate.

5. The axle assembly of claim 3 wherein the lubricant conduit provides lubricant to the inlet.

6. An axle assembly comprising:
    a housing having an arm portion;
    a reservoir module that is disposed in the arm portion and configured to hold a volume of a lubricant, the reservoir module having a tube portion that is completely spaced apart from the housing; and
    an axle that is disposed in the arm portion such that the axle extends through and is spaced apart from the tube portion, wherein the tube portion is configured to flex with respect to the axle.

7. An axle assembly comprising:
    a housing having an arm portion and a sump portion;
    a reservoir module that is disposed in the arm portion, the reservoir module including a first end plate, a second end plate, and a tube portion that extends from the first end plate to the second end plate;
    an axle that is disposed in the arm portion such that the axle extends through and is spaced apart from the tube portion; and
    a differential that is configured to rotate the axle and that is disposed in the housing proximate the sump portion, wherein the first end plate faces toward the differential and includes a first outlet for providing a lubricant to the sump portion.

8. The axle assembly of claim 7 wherein the axle assembly further comprises a lubricant conduit that is disposed in the housing for providing the lubricant to an inlet of the reservoir module.

9. The axle assembly of claim 7 wherein the second end plate includes a second outlet.

10. The axle assembly of claim 7 wherein the first end plate, second end plate, and tube portion at least partially define a reservoir cavity that stores the lubricant.

11. The axle assembly of claim 10 wherein the first end plate includes an inlet for providing the lubricant to the reservoir cavity.

12. An axle assembly comprising:
    a housing having an arm portion;
    a reservoir module that is disposed in the arm portion, the reservoir module including a first end plate, a second end plate, a tube portion that extends from the first end plate to the second end plate, and a set of side plates, wherein each member of the set of side plates extends from the first end plate to the second end plate and is spaced apart from the tube portion; and
    an axle that is disposed in the arm portion such that the axle extends through and is spaced apart from the tube portion;
    wherein the first end plate, second end plate, and tube portion at least partially define a reservoir cavity that stores a lubricant.

13. The axle assembly of claim 12 wherein each member of the set of side plates engages at least one other member of the set of side plates.

14. The axle assembly of claim 12 wherein a member of the set of side plates includes an inlet.

15. An axle assembly comprising:
    a housing having an arm portion;

a reservoir module that is disposed in the arm portion, the reservoir module including a first end plate, a second end plate, and a tube portion that extends from the first end plate to the second end plate;

a seal that is disposed between and engages the first end plate and the housing; and an axle that is disposed in the arm portion such that the axle extends through and is spaced apart from the tube portion.

16. The axle assembly of claim 15 wherein the first end plate includes a first outlet.

17. The axle assembly of claim 16 wherein the first outlet is disposed below the axle and the tube portion.

18. An axle assembly comprising:

a housing having an arm portion;

a differential that is disposed in the housing and spaced apart from the arm portion;

an axle that is disposed in the arm portion and configured to be rotated by the differential; and a reservoir module that is disposed in the arm portion and that at least partially defines a reservoir cavity that is configured to receive a lubricant, the reservoir module including:

a first end plate having an outlet, a second end plate that is spaced apart from the first end plate, a tube portion that extends from the first end plate to the second end plate, and a valve for controlling flow of the lubricant through the outlet;

wherein the axle is spaced apart from the reservoir module and extends through the tube portion.

19. The axle assembly of claim 18 further comprising a volume sensor disposed in the reservoir module for providing a signal indicative of a volume of lubricant in the reservoir cavity, wherein the valve is opened when the volume of lubricant exceeds a threshold volume value.

20. The axle assembly of claim 18 further comprising a differential temperature sensor that detects a temperature proximate the differential, wherein the valve is opened when the temperature exceeds a threshold differential temperature value.

* * * * *